United States Patent [19]

Hakki

[11] Patent Number: 5,659,412

[45] Date of Patent: Aug. 19, 1997

[54] POLARIZATION DIVERSITY DETECTION OF OPTICAL SIGNALS TRANSMITTED THROUGH A POLARIZATION-MODE DISPERSIVE MEDIUM

[75] Inventor: Basil Wahid Hakki, Allentown, Pa.

[73] Assignee: Lucent Technologies Inc., Murray Hill, N.J.

[21] Appl. No.: 350,287

[22] Filed: Dec. 6, 1994

[51] Int. Cl.[6] .............................. H04B 10/00; H04B 10/06
[52] U.S. Cl. ................................. 359/156; 359/192
[58] Field of Search ............................ 359/156, 161, 359/192, 158

[56] References Cited

U.S. PATENT DOCUMENTS

| | | | |
|---|---|---|---|
| 3,752,992 | 8/1973 | Fluhr | 250/199 |
| 4,572,608 | 2/1986 | Mochizuki et al. | 350/96.15 |
| 4,723,315 | 2/1988 | Wetherell | 455/619 |
| 4,897,543 | 1/1990 | Kersey | 250/227 |
| 5,033,830 | 7/1991 | Jameson | 350/403 |
| 5,048,937 | 9/1991 | Takeda et al. | 359/301 |
| 5,117,469 | 5/1992 | Cheung et al. | 385/11 |
| 5,153,512 | 10/1992 | Glasheen | 250/227 |
| 5,212,586 | 5/1993 | Val Delden | 359/192 |
| 5,227,623 | 7/1993 | Heffner | 250/227 |
| 5,267,077 | 11/1993 | Blonder | 359/282 |
| 5,283,846 | 2/1994 | Toyonaka et al. | 385/27 |
| 5,295,013 | 3/1994 | Ono | 359/156 |
| 5,311,346 | 5/1994 | Haas et al. | 359/156 |
| 5,315,431 | 5/1994 | Masuda et al. | 359/281 |
| 5,317,655 | 5/1994 | Pan | 385/11 |
| 5,327,511 | 7/1994 | Heismann et al. | 385/1 |
| 5,341,235 | 8/1994 | Watanabe et al. | 359/281 |
| 5,361,270 | 11/1994 | Heismann | 385/11 |

FOREIGN PATENT DOCUMENTS

| | | | |
|---|---|---|---|
| 0310174 A1 | 4/1989 | European Pat. Off. | H04B 9/00 |
| 0403991 A2 | 12/1990 | European Pat. Off. | H04B 10/12 |
| 87/05762 | 9/1987 | WIPO | H04B 9/100 |
| 94/21059 | 9/1994 | WIPO | H04B 10/12 |

OTHER PUBLICATIONS

Chen, C.D., et al., "A Field Demonstration of 10Gb/s–360km Transmission Through Embedded Standard (non–DSF) Fiber Cables," OFC '94 Technical Digest, San Jose, California, Feb. 20–25, 1994, pp. 124–127.

Chen, C.D., et al., "10Gb/s Prototype System Performance in Field Experiment," Fifth Optoelectronics Conference (OEC '94) Technical Digest, Makuhari Messe, Japan, Jul. 1994, pp. 368–369.

Heismann, F., "Analysis of a Reset–Free Polarization Controller for Fast Automatic Polarization Stabilization in Fiber–optic Transmission Systems," Journal of Lightwave Technology, vol. 12, No. 4, Apr. 1994, pp. 690–699.

Heismann, F., and Whalen, M.S., "Fast Automatic Polarization Control System," IEEE Photonics Technology Letters, vol. 4, No. 5, May 1992, pp. 503–505.

(List continued on next page.)

*Primary Examiner*—Leo Boudreau
*Assistant Examiner*—Bhavesh Mehta

[57] ABSTRACT

An apparatus and method which utilize polarization diversity detection to compensate for polarization-mode dispersion (PMD) introduced in an optical signal propagating over a medium such as optical fiber. A received optical signal is separated into first and second polarization components by a polarization beam splitter (PBS). A control signal corresponding to a phase difference between the polarization components is used to drive at least one polarization controller located in the optical signal path before the PBS, such that the two polarization components are aligned with the PSPs of the received optical signal. The control signal may also be used to adjust a variable delay element such that phases of the two polarization components are aligned before the components are combined to provide a PMD-compensated output signal. Other aspects of the invention are directed to polarization control using a rotator element with low numerical aperture input and output signal coupling, and to the use of feedback control to compensate for variations in loss through a polarization controller.

19 Claims, 3 Drawing Sheets

OTHER PUBLICATIONS

Heismann, F., and Whalen, M.S., "Broadband Reset–Free Automatic Polarization Controller," Electronic Letters, vol. 27, No. 4, Feb. 14, 1991, pp. 377–379.

Heismann, F., et al., "Polarization–Independent Photonic Switching System Using Fast Automatic Polarization Controllers," IEEE Photonics Technology Letters, vol. 5, No. 11, Nov. 1993, pp. 1341–1343.

Heismann, F. et al., "Automatic Polarisation Demultiplexer for Polarization–Multiplexed Transmission Systems," Electronics Letters, vol. 29, No. 22, Oct. 28, 1993, pp. 1965–1966.

Okoshi, T., et al., "New Polarisation–Control Scheme for Optical Heterodyne Receiver Using Two Faraday Rotators," Electronics Letters, vol. 21, No. 18, Aug. 29, 1985, pp. 787–788.

Poole, C.D., and Wagner, R.E., "Phenomenological Approach to Polarisation Dispersion in Long Single–Mode Fibres," Electronics Letters, 2 pages.

Wolfe, R., and Lieberman, R.A., "Fiber Optic Magnetic Field Sensor Based on Domain Wall Motion in Garner Film Waveguides," Appl. Phys. Lett. 58 (16), Apr. 22, 1991, pp. 1733–1735.

Yoshimura, M., et al., "Polarization Mode Dispersion Equalization," Fifth Optoelectronics Conference (OEC '94) Technical Digest, Makuhari Messe, Japan, Jul. 1994, pp. 258–259.

Avantek, An–S013: MagIC Active Mixers.

Avantek, AN–S010: A 5.0 GHz Bipolar Active Mixer.

NARDA, Digital Precision Coaxial Phase Shifters, pp. 74–75.

JDS Fitel, HD3 Series Optical Delay.

POLARIZATION DIVERSITY DETECTION OF OPTICAL SIGNALS TRANSMITTED THROUGH A POLARIZATION-MODE DISPERSIVE MEDIUM

TECHNICAL FIELD

The present invention relates generally to improvements in lightwave communication systems. More particularly, the present invention relates to techniques for detecting optical signals transmitted over a medium, such as single-mode optical fiber, which exhibits polarization mode dispersion (PMD).

BACKGROUND OF THE INVENTION

In lightwave communication systems which utilize optical fiber as a transmission medium, polarization-mode dispersion (PMD) often presents a significant obstacle to achieving higher data rates and/or longer repeaterless transmission distances. PMD refers generally to variations in the delay time of an optical signal through the medium as a function of signal polarization, which can cause randomly varying pulse width distortion in the received signal. PMD arises in optical fiber because a fiber core is usually not perfectly symmetric, and therefore the propagation speed of a signal at one polarization, such as an s-polarization, may be different than the propagation at another polarization, such as a p-polarization. In a single-mode fiber, at each signal wavelength there generally exists a pair of orthogonal input polarization states, referred to as the principle states of polarization (PSPs) in the fiber, for which the corresponding states of polarization at the output of the fiber are orthogonal and independent of wavelength to first order. See, for example, C. D. Poole and R. E. Wagner, "Phenomenological Approach to Polarization Dispersion in Long Single-Mode Fibres," Electronics Letters, Vol. 22, pp. 1029–1030, September, 1986, which is incorporated by reference herein. Ignoring wideband frequency-dependent effects such as fiber chromatic dispersion, and to a first-order approximation, an optical signal transmitted through the fiber in either fiber PSP is generally undistorted at the receiver but has a different time delay depending upon the PSP in which it was transmitted. An optical signal with an arbitrary state of polarization (SOP) can be expressed as a sum of signals in each fiber PSP, and when received after transmission through the fiber the signal can therefore be characterized as a combination of two orthogonally-polarized signals with different time delays. Because the fiber PSPs and corresponding time delays typically vary as a function of, for example, temperature and changes in position or other movement of the fiber, the received signal exhibits time-varying distortion. The fact that PMD-induced distortion manifests itself in single-mode fiber is of particular concern because much of the existing or "embedded" optical fiber infrastructure throughout the world utilizes this type of fiber.

A known technique for limiting PMD-induced distortion in a detected signal is described in U.S. Pat. No. 5,311,346, entitled "Fiber-Optic Transmission Polarization-Dependent Distortion Compensation," which is assigned to the assignee of the present invention and incorporated by reference herein. An embodiment of this exemplary technique utilizes a polarization controller to adjust the polarization of an optical signal at either the input or the output of a length of fiber. The signal polarization is adjusted such that a performance measure of received signal quality is optimized. Exemplary measures of signal quality which are utilized include bit-error-rate (BER), signal-to-noise ratio (SNR) and received signal eye opening. Although this system substantially reduces PMD-induced distortion, a significant number of additional components may be required to measure received signal quality in certain embodiments.

Another technique for reducing PMD-induced distortion, described in M. Yoshimura et al., "Polarization Mode Dispersion Equalization," Technical Digest, Fifth Optoelectronics Conference (OEC '94), Paper 14E-12, July, 1994, includes a PMD equalizing circuit which is driven by an error signal. The error signal is generated as the difference between a detected optical signal and a reference waveform derived from the detected signal. This technique uses an equalizing circuit which includes a number of different phase shifters and variable TE/TM converters to provide suitable optical signal adjustments in response to the error signal, and is therefore complicated, expensive to implement and overly sensitive to factors unrelated to PMD-induced distortion including, for example, chromatic dispersion. Other techniques are described in, for example, T. Okoshi et al., "New Polarization-Control Scheme for Optical Heterodyne Receiver Using Two Faraday Rotators," Electronics Letters, Vol. 21, No. 18, pp. 787–788, August, 1985, and F. Heismann et al., "Automatic Polarization Demultiplexer for Polarization-Multiplexed Transmission Systems," Electronics Letters, Vol. 29, No. 22, pp. 1965–1966, October, 1993. These techniques are generally directed to varying input signal polarization such that the detected signal power level in a particular polarization state is maximized. Because factors unrelated to PMD may alter detected signal power level, these and other prior art techniques may be unable to adequately compensate for PMD-induced distortion.

As is apparent from the above, a need exists for improved detection of optical signals received over single-mode optical fiber and other polarization-mode dispersive transmission media.

SUMMARY OF THE INVENTION

The present invention provides an apparatus and method for detecting signals transmitted through an optical transmission medium which exhibits polarization-dependent transmission properties. In accordance with one aspect of the present invention, an optical signal received from a fiber optic transmission medium is separated into first and second polarization components by a polarization beam splitter (PBS). First and second clock signals are recovered using the first and second polarization components, respectively. A phase difference between the first and second clock signals is measured and used to provide a control signal suitable for driving a polarization controller located in the optical signal path before the PBS. The polarization of the input signal is adjusted such that, for example, the phase difference between the two clock signals is maximized, thereby continually aligning the two polarization components with the PSPs of the received optical signal. The phase difference control signal may also be used to adjust a variable delay element to align the phases of two detected electrical signals generated from the first and second polarization components, before the electrical signals are combined in a signal combiner to provide a PMD-compensated output electrical signal. In alternative embodiments, the phase difference control signal may be used to align the optical phase of the first and second polarization components before the components are recombined in a polarization beam combiner and then detected to provide a PMD-compensated output electrical signal.

The present invention thus utilizes a direct measure of the phase difference between two polarization components of a received signal to continually align the polarization components with respect to the PSPs of the received signal such that PMD-induced distortion is compensated. The phase difference may be measured, for example, between recovered clock signals and is therefore generally insensitive to power fluctuations and other signal variations unrelated to PMD. Moreover, the phase difference can be measured and controlled in a straightforward manner using relatively simple and inexpensive components.

Another aspect of the present invention involves the manner in which the polarization of an optical signal is adjusted in response to the control signal. A polarization controller is provided which may be utilized in conjunction with polarization diversity detection or any of a number of other optical signal processing techniques. The polarization controller may include a Faraday rotator element with, for example, one or more active garnet layers which provide a substantially linear polarization rotation as a function of magnetic field. An optical coupling means with a low numerical aperture is used to couple the optical signal out of the rotator element, such that sensitivity to beam scattering is substantially reduced. The polarization controller may be used with a stationary quarter-wave plate (QWP) to adjust the ellipticity of an optical beam, and in combination with an additional controller to provide substantially full coverage of the Poincaré sphere. The polarization control of the present invention can thus be readily configured to accommodate both small, short-term received signal polarization variations as well as larger, long-term variations.

A further aspect of the present invention is directed to compensating for variations in optical signal loss in a polarization controller. A portion of an optical signal at the controller output is detected and used in a feedback control loop to adjust the power level of a source which generates the optical signal. This polarization controller loss compensation may be utilized in a variety of different optical applications.

The above-discussed features, as well as additional features and advantages of the present invention, will become apparent by reference to the following detailed description and accompanying drawings.

DETAILED DESCRIPTION

Figure 1:
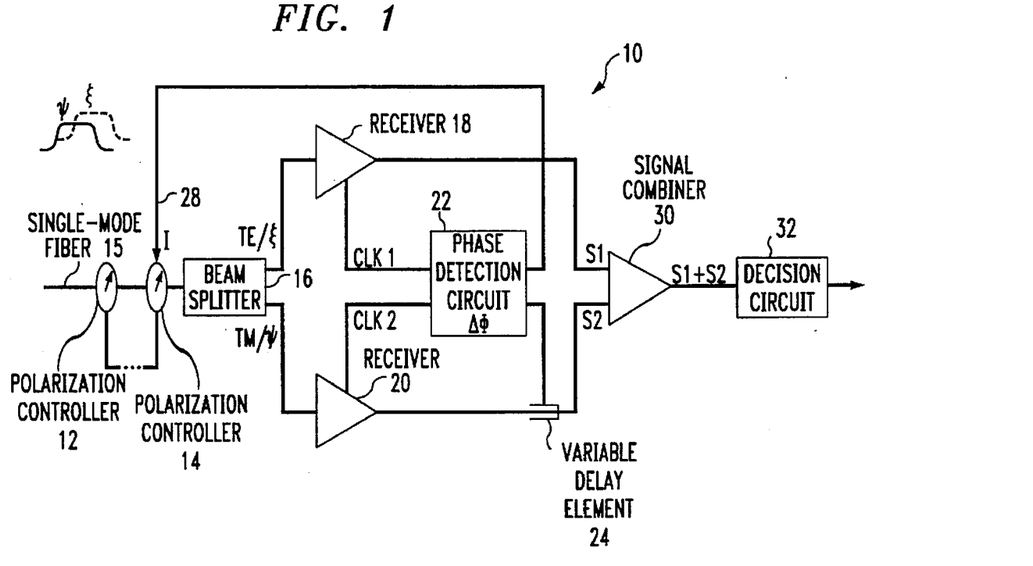
FIG. 1 shows an exemplary polarization diversity detection circuit in accordance with the present invention.

FIG. 1 shows an exemplary polarization diversity detection circuit 10 in accordance with the present invention. A received optical signal is distorted by polarization mode dispersion (PMD) in passing through a length of single-mode optical fiber 15. The optical signal can be expressed as a sum of two signals with two different polarization states. These two polarization states are referred to as the principal states of polarization (PSPs) of the received optical signal. Each PSP can be considered as a separate signal pulse which exhibits a delay determined by the PMD of the optical fiber 15. A first pulse $\xi$ corresponds to one PSP and a second pulse $\psi$ corresponds to a second PSP. Fiber PMD results in pulse $\xi$ arriving ahead of pulse $\psi$ as shown qualitatively at the optical signal input of diversity detection circuit 10.

The circuit 10 utilizes polarization controllers 12, 14 to continually align the polarization of the received optical signal in order to compensate for PMD-induced distortion. The polarization controller 12 may utilize, for example, electromechanically-controlled half-wave and quarter-wave plates with moderately slow rotation speeds, on the order of about $\pi$ radians/second, and with substantially unlimited maximum rotation capabilities. The polarization controller 14 may include, for example, a Faraday rotator in which the optical signal polarization is rotated electro-optically by controlling a magnetic field in a manner to be described in detail below. The polarization controller 14 has a relatively fast rotation speed, for example, greater than about $100\pi$ radians/sec, but a maximum rotation capability limited to some finite value, for example, about $3\pi$ radians. Although shown as separate controllers in FIG. 1, it should be understood that in alternative embodiments, the controllers 12, 14 could be combined into a single device.

Alternative arrangements of polarization controllers with other rotation speeds and/or maximum rotations could also be used, including those described in U.S. Pat. No. 5,327,511, which is assigned to the assignee of the present invention and incorporated by reference herein. Other suitable polarization controllers are described in, for example, F. Heismann and M. Whalen, "Broadband Reset-Free Automatic Polarization Controller," Electronics Letters, Vol. 27, No. 4, pp. 377–379, February, 1991; F. Heismann et al., "Polarization-Independent Photonic Switching System Using Fast Automatic Polarization Controllers," IEEE Phot. Tech. Letters, Vol. 5, No. 11, pp. 1341–1343, November, 1993; F. Heismann and M. Whalen, "Fast Automatic Polarization Control System," IEEE Phot. Tech. Letters, Vol. 4, No. 5, pp. 503–505, May, 1992; F. Heismann, "Analysis of a Reset-Free Polarization Controller for Fast Automatic Polarization Stabilization in Fiber-Optic Transmission Systems," Journal of Lightwave Tech., Vol. 12, No. 4, pp. 690–699, April, 1994; and R. Wolfe and R. A. Lieberman, "Fiber Optic Magnetic Field Sensor Based on Domain Wall Motion in Garnet Film Waveguides," Appl. Phys. Lett., Vol. 58, No. 16, pp. 1733–1735, April, 1991, all of which are incorporated by reference herein.

The polarization controllers 12, 14 align the PSPs of the received optical signal with the polarization axes of a polarization beam splitter (PBS) 16. The transverse electric (TE) and transverse magnetic (TM) polarization outputs of the PBS 16 will therefore each substantially correspond to one of the PSPs of the received optical signal. The PBS 16 separates the received optical signal into first and second polarization components. The first and second polarization components are supplied to receivers 18, 20, respectively. The receivers 18, 20 generate clock signals CLK1 and CLK2 from the first and second polarization components of the received optical signal, respectively, in a manner well-known in the art. Suitable receivers operating at a data rate of about 10 Gbits/sec are described in, for example, C. D. Chen et al., "10 Gb/s Prototype System Performance in Field Experiment," Fifth Optoelectronics Conference (OEC '94) Technical Digest), Paper 15C1-2, July, 1994; and C. D. Chen et al., "A Field Demonstration of 10 Gb/s–360 km Transmission Through Embedded Standard (non-DSF) Fiber Cables," Optical Fiber Communication (OFC '94) Technical Digest, Paper PD27-1, pp. 124–127, February, 1994, which are incorporated herein by reference. A phase detection circuit 22 measures a phase difference $\Delta\phi$ between the clock signals CLK1 and CLK2. In this embodiment, the phase difference $\Delta\phi$ is maximized by supplying a control signal corresponding to the phase difference to the polarization controllers 12, 14 via line 28. Maximizing the phase difference between CLK1 and CLK2 ensures proper alignment of the first and second polarization components at the PBS output with the PSPs of the received optical signal. As noted previously, the PSPs of the received optical signal generally vary with time. Adjustment of the polarization controllers 12, 14 is designed to maintain maximum phase difference between the polarization components over time, which will generally occur if the polarization components are aligned with the varying PSPs of the received signal. Under these conditions, detected signals S1 and S2 at the output of receivers 18 and 20, respectively, represent undistorted versions of the original modulation waveform but with a phase difference $\Delta\phi$ between them. The phase detection circuit 22 may be a phase detector based on a Gilbert cell active mixer, such as the Model Nos. IAM-81 or IAM-82 available from Avantek and described in Avantek Application Note No. AN-S013. Many other phase detectors are well-known in the art and may be used in circuit 22. Furthermore, in alternative embodiments a phase difference control signal may be generated from detected data signals rather than clock signals, or directly from the polarization components. Suitable means for generating such control signals will be readily apparent to those skilled in the art.

The phase detection circuit 22 also adjusts the delay between the two detected electrical signals S1 and S2 using a variable electrical delay element 24 such that signals S1 and S2 are in-phase at the input of an electrical signal combiner 30. The variable delay element 24 may be, for example, an electrical line stretcher which varies the length of a detected signal line in response to an applied control signal. A suitable variable delay element 24 may incorporate a digital coaxial phase shifter such as Model No. 3752 or 3753B available from Narda, along with a stepper motor adapted to adjust the phase shift in response to the control signal. Any of a number of other well-known variable delay elements may also be used. Signal combiner 30 then combines signals S1 and S2 to provide a compensated detected signal which exhibits substantially lower PMD-induced distortion than would a detected signal resulting from direct detection of the received optical signal. The compensated detected signal is then supplied to a conventional decision circuit 32.

Figure 2:
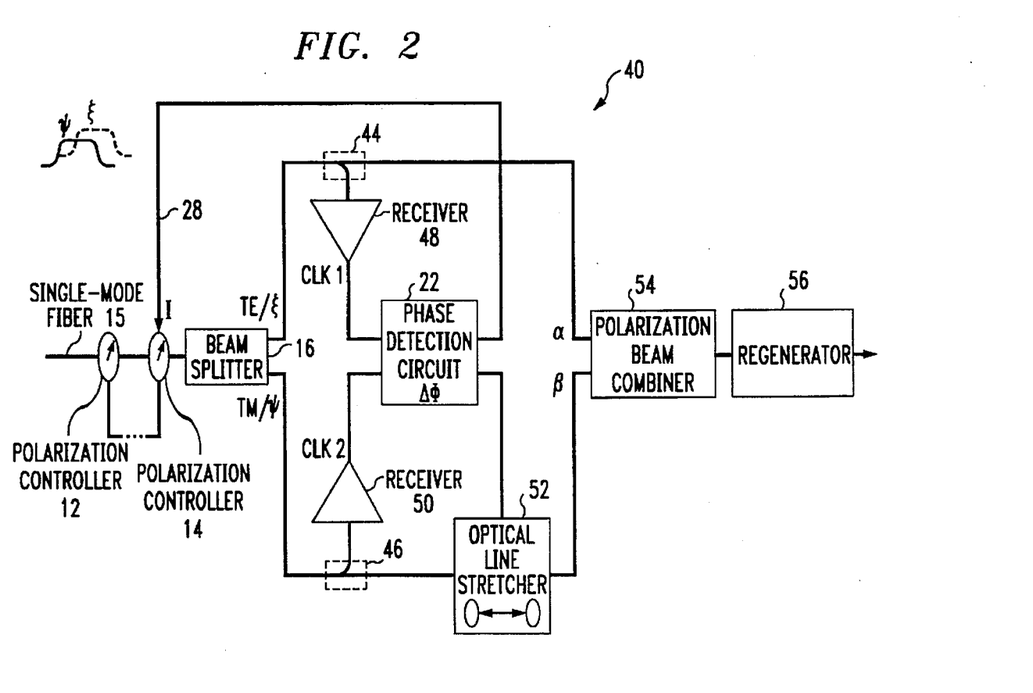
FIG. 2 shows an alternative embodiment of a polarization diversity detection circuit in accordance with the present invention.

FIG. 2 shows an alternative embodiment of the present invention in which optical couplers 44, 46 are used to couple a portion of each polarization component from PBS 16 into receivers 48, 50. The couplers may be selected to provide a coupled portion at a power level about 10 dB below the uncoupled portion power level. The receivers 48, 50 generate clock signals CLK1 and CLK2 which are applied to phase detection circuit 22. The phase detection circuit 22 generates a control signal corresponding to the phase difference between the two clock signals. The control signal is applied to the polarization controllers 12, 14 via line 28 to adjust the polarization of the received optical signal in the manner described above in conjunction with FIG. 1. The control signal is also applied to a control input of an optical line stretcher 52. The line stretcher 52 adjusts the delay between the first and second polarization components $\alpha$ and $\beta$ such that $\alpha$ and $\beta$ are in-phase at the input of a polarization beam combiner 54. The line stretcher 52 may be, for example, an HD3 Series Optical Delay device from JDS FITEL Inc. of Ontario, Canada, or another suitable variable optical delay element. The output of beam combiner 54 is a compensated optical signal which exhibits substantially less PMD-induced distortion than the received optical signal. The compensated optical signal can then be supplied to a conventional regenerator 56 which may include optical detectors and clock recovery circuitry suitable for generating a baseband data stream from the compensated optical signal. It is preferred that any fiber connections between PBS 16 and beam combiner 54 utilize polarization-maintaining fiber (PMF).

Figure 3:
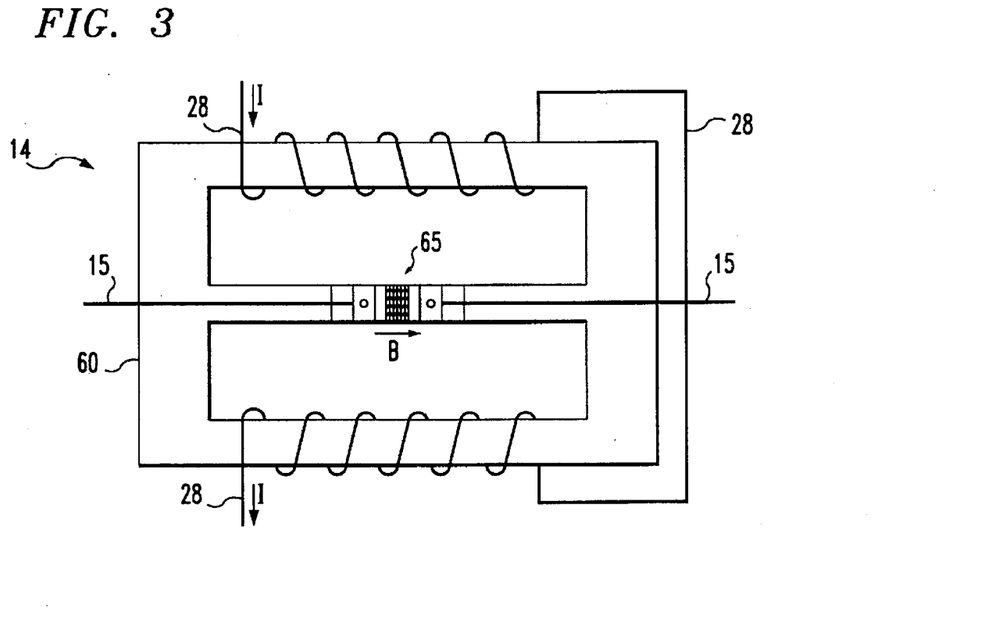
FIG. 3 is a view of an exemplary polarization controller in accordance with the present invention which is suitable for use in the circuits of FIGS. 1 and 2.

FIG. 3 illustrates the exemplary polarization controller 14 of FIGS. 1 and 2 in greater detail. The controller 14 is an electro-optical Faraday rotator which includes a core 60 around which line 28 is wrapped. The control signal passing through line 28 from the phase detection circuit 22 in the form of a current I creates a magnetic field B in the vicinity of the core 60. Other means for generating a magnetic field from the control signal include, for example, any of a number of different configurations of magnetic or non-magnetic cores, wires, solenoids or electromagnets. A rotator element 65 is arranged within single-mode fiber 15 in a central region surrounded by the core 60. The rotator element 65 rotates the polarization of the optical signal passing through it in response to variations in the magnetic field B. To provide the desired fast rotation in the polarization of the received optical signal, the rotator element 65 utilizes the Faraday effect in a crystal material. The magnetic field B is generally less than that required to provide saturation in the crystal material. Any number of different materials can be used as Faraday effect materials herein, including, for example, the active garnet materials $(YbTbBi)_3Fe_5O_{12}$ and $(BiLuGd)_3Fe_5O_{12}$. In addition, alternative polarization controllers could utilize any type of material which provides polarization rotation in response to a control signal. The electrical current I through line 28 controls the magnetic field B and hence the polarization rotation angle $\theta$ in rotator element 65. In order to obtain a maximum rotation angle of at least $3\pi$ radians with a minimum-strength magnetic field, it may be necessary to include a stack of several Faraday effect crystals in rotator element 65, as will be described below. The control signal current I can also be used to generate a suitable driving current which is applied to, for example, a stepper motor (not shown) controlling the rotation of polarization controller 12. As noted above, polarization controller 12 is adjusted such that the polarization components at the output of the PBS 16 track long-term variations in the received optical signal PSPs. Polarization controller 14 with Faraday rotator element 65 provides adjustments to track more rapid variation in received signal PSPs.

Figure 4A:
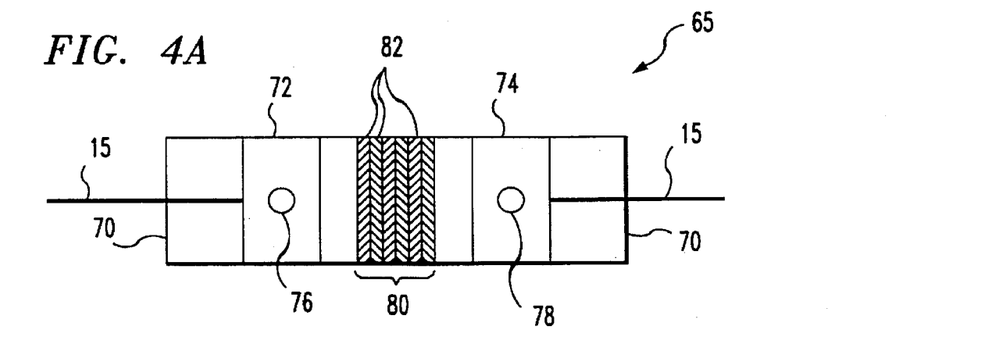
FIGS. 4A and 4B are detailed top and side views, respectively, of a portion of the exemplary polarization controller of FIG. 3.
Figure 4B:
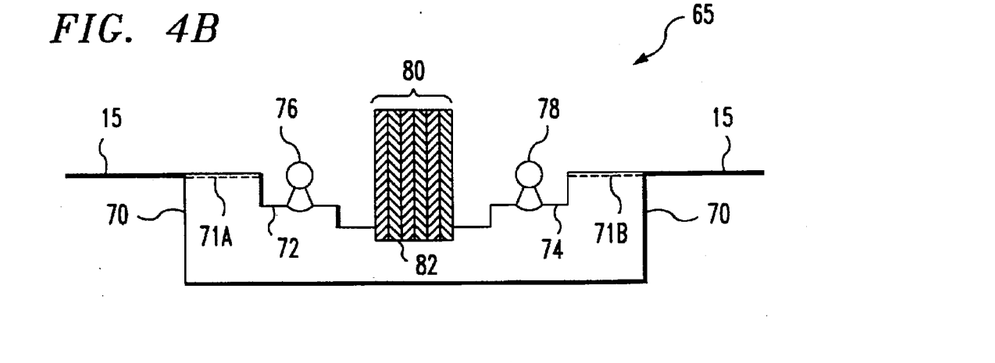

FIGS. 4A and 4B show the rotator element 65 of the polarization controller 14 in more detail. A support 70 includes two grooves 71A and 71B that are substantially collinear and provide alignment trenches for single-mode fiber 15 at the input and output of rotator element 65. The optical signal is collimated by spherical collimating lenses 76, 78 that are suitably arranged in etched depressions 72, 74, respectively. The collimating lenses preferably have a low numerical aperture such that the portions of the optical signal coupled out of rotator element 65 generally do not include those portions, if any, which are subject to excessive scattering. Although beam scattering is primarily reduced by the output collimating lens 78, the embodiment of FIGS. 4A and 4B also includes low numerical aperture lens 76 to couple the optical signal into the rotator element. In one exemplary embodiment, a suitable low numercial aperture lens is one which produces an output beam diameter of about 300 µm at a signal wavelength of about 1550 nm. The present invention provides improved polarization control in part by providing a Faraday rotator which exhibits reduced sensitivity to scattering of the optical signals passing through it. Other low numerical aperture optical elements could be used as an optical signal coupling means in place of collimating lenses 76, 78. The operation and arrangement of these alternative optical elements will be readily apparent to those skilled in the art. The collimated optical signal passes through a stack 80 of Faraday effect crystal material comprised of several distinct active garnet layers 82. The stack 80 rotates the input signal polarization by an angle θ which is a function of the field B and the total thickness of active garnet material.

In one embodiment of the present invention, each of the active garnet layers 82 in the stack 80 is about 500 µm thick and about 2.0 mm by 2.0 mm in cross-section. The large surfaces of the layers 82 may be provided with an anti-reflective (AR) coating suitable for optical signal transmission at a particular wavelength. It should be noted that the layers 82 in FIGS. 4A and 4B are not shown to scale. Each layer 82 in the exemplary rotator element 65 can be configured to provide a rate of rotation of about 0.09 degrees/ Gauss which is nearly constant as a function of the applied magnetic field B. The saturation field of the garnet layers is about 600 Gauss, and each layer 82 can provide a total rotation of about 45° with an optical signal transmission loss of about 0.2 dB. It should be noted that signal loss through the garnet material may increase at low magnetic field strengths in certain embodiments, and it may therefore be desirable to operate the controller within a restricted range of higher field strengths. The use of feedback control to compensate for variations in polarization controller signal transmission loss with magnetic field will be described below in conjunction with FIG. 6. In addition, it should also be noted that the use of low numerical aperture input and output coupling optics and/or excessive distances between the coupling optics and the rotator element may increase signal loss.

The rotator element arrangement of FIGS. 3 and 4 may be used in any of a number of polarization control applications. For example, the rotator element 65 could be used in conjunction with a stationary quarter-wave plate to adjust the ellipticity of an optical signal. A stationary quarter-wave plate could be placed, for example, between stack 80 and the output collimating lens, using a mounting bracket or a slot in support 70. Other arrangements which include two Faraday rotator elements, one with and the other without a quarter-wave plate, could be used to provide substantially full coverage of the Poincare sphere. Those skilled in the art will recognize many other alternative arrangements of the rotator element 65 and polarization controller 14 which may be constructed utilizing the teachings of the present invention.

Figure 5:
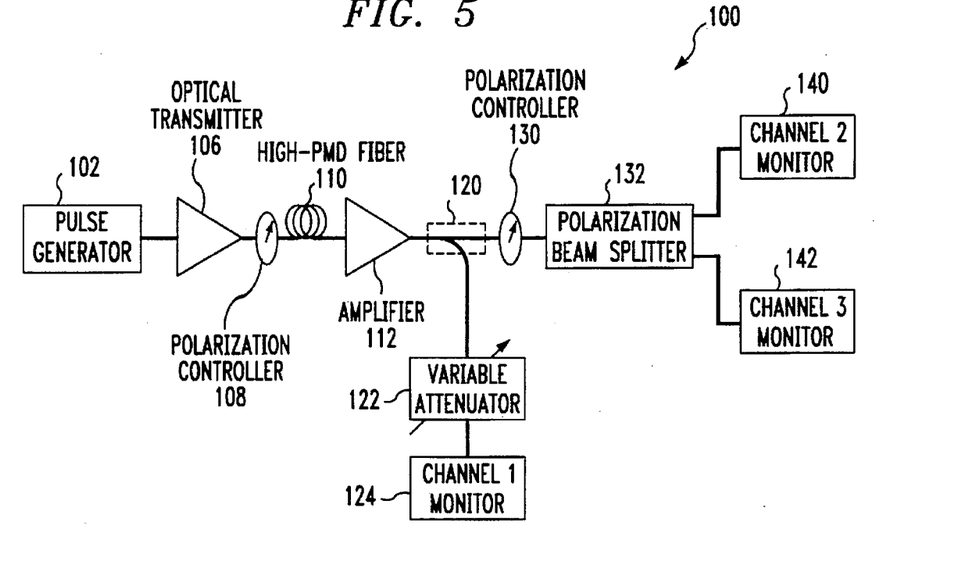
FIG. 5 is a block diagram of an exemplary optical system which demonstrates PMD compensation in accordance with the present invention.

FIG. 5 shows a system 100 suitable for demonstrating the detection of an optical signal in accordance with the present invention. The delays in each of the three primary optical signal paths designated CH1, CH2 and CH3 in system 100 are first equalized with a length of high-PMD fiber 110 removed from the system. The three channels CH1, CH2 and CH3 correspond to a coupled portion of a received optical signal, a first polarization component and a second polarization component, respectively. An optical pulse generator 102 operates in this example at a bit rate of about 10.0 Gbits/sec and provides either a periodic 1010 pattern or a pseudo-random bit sequence of length $2^{23}-1$. The pulse generator 102 drives a 10.0 Gbits/sec optical transmitter 106 that operates in this example at a wavelength of about 1552 nanometers. The optical transmitter 106 supplies an input optical signal to a first polarization controller 108 and then to the length of high-PMD single-mode fiber 110. The high-PMD fiber 110 in this example is comprised of two different sections of dispersion-shifted fiber (DSF) having average PMD of about 30 and 35 picoseconds, respectively. Polarization controller 108 controls the polarization of the optical signal launched into the high-PMD fiber 110, and may be, for example, a mechanical paddle-type polarization rotator. The output of the high-PMD fiber 110 is the received optical signal. An amplifier 112, which may be an erbium-doped fiber amplifier (EDFA), amplifies the received optical signal. The amplified signal is monitored through a 10 dB coupler 120 and a variable attenuator 122 on a CH1 monitor 124. A second polarization controller 130 is used to rotate the polarization of the received optical signal before it is applied to a PBS 132. The PBS 132 separates the received optical signal into two orthogonally-polarized polarization components which are applied to CH2 monitor 140 and CH3 monitor 142, respectively. Each of the monitors 124, 140 and 142 includes a detector or regenerator for recovering the 10 Gbits/sec data generated in pulse generator 102. The monitors may also include an oscilloscope or other suitable detected signal display means.

The detected signal strength observed on the monitors 140, 142 will generally vary depending upon the PSPs of the received signal before it is applied to the PBS 132 in the system 100. If polarization controller 108 is adjusted to provide minimum optical signal delay as observed on CH1 monitor 124, and polarization controller 130 is adjusted to provide maximum detected signal strength as observed on CH2 monitor 140, minimum detected signal strength is observed on the CH3 monitor 142. If polarization controller 108 is adjusted to provide maximum optical signal delay as observed on CH1 monitor 124, resulting in an observed delay of about 70 ps in this example, and polarization controller 130 remains unchanged from its previous adjustment, CH2 monitor 140 exhibits substantially reduced detected signal strength and CH3 monitor 142 exhibits a maximum-strength detected signal substantially in-phase with the detected signal observed on CH1 monitor 124. These results demonstrate that when the launched optical signal polarization is aligned with one PSP of the high-PMD fiber 110, the received signal at the output of fiber 110 has a delay time $\tau_0+\Delta\tau/2$ where $\tau_0$ is the optical signal transit time through fiber 110 and $\Delta\tau$ is the total PMD-induced delay time. When the input optical signal polarization is aligned with the other PSP of the fiber 110, the received optical signal has a delay time $\tau_0-\Delta\tau/2$.

The polarization controllers 108 and 130 may be adjusted in accordance with the present invention to simultaneously provide an optimal detected signal output on both CH2 and CH3 monitors 140, 142. If polarization controller 108 is adjusted to provide a distorted detected signal by launching an optical signal with two given PSPs at the input of the high-PMD fiber 110, polarization rotator 130 may be adjusted to provide maximum phase difference between the output signal components observed on CH2 monitor 140 and CH3 monitor 142. Under this condition, the delay time difference between the two detected signals is about 70 ps and the detected signals in each output channel exhibit a waveform very similar to that of the modulation on the original launched optical signal. The detected signals monitored on channels CH2 and CH2 may therefore be combined, using a suitable signal combiner such as detected signal combiner 30 of FIG. 1, to provide a detected signal which exhibits substantially no PMD-induced distortion. Alternatively, the optical signals applied to the CH2 and CH3 monitors may be combined in an optical signal combiner such as polarization beam combiner 54 of FIG. 2 and then detected in, for example, regenerator 56 or another suitable detector. By maximizing the phase difference between orthogonally-polarized components of the received optical signal, the present invention compensates for the otherwise adverse affects of PMD. Similar results are observed when the system 100 of FIG. 5 is used with an optical signal modulated by a pseudo-random bit sequence of length $2^{23}-1$. Although distortion arising from PMD is readily apparent in such an arrangement in a detected signal eye diagram observed on CH1 monitor 124, a substantially improved eye diagram is observed after proper adjustment of polarization controller 130 in accordance with the present invention to align the polarization components at the output of PBS 132 with the received signal PSPs at the output of the high-PMD fiber 110.

The present invention is based in part on the discovery that, although the value of PMD-induced delay time in single-mode fiber at the optical signal wavelength may change randomly over a long period of time such as weeks or months, its variation over a period of seconds or minutes is relatively slow. This relative stability of delay time allows control circuits to determine the output PSPs of the received signal and to separately recover the undistorted waveforms in each of these output PSPs. Recombining the two output waveforms after appropriate delays then substantially cancels the effects of fiber PMD.

Figure 6:
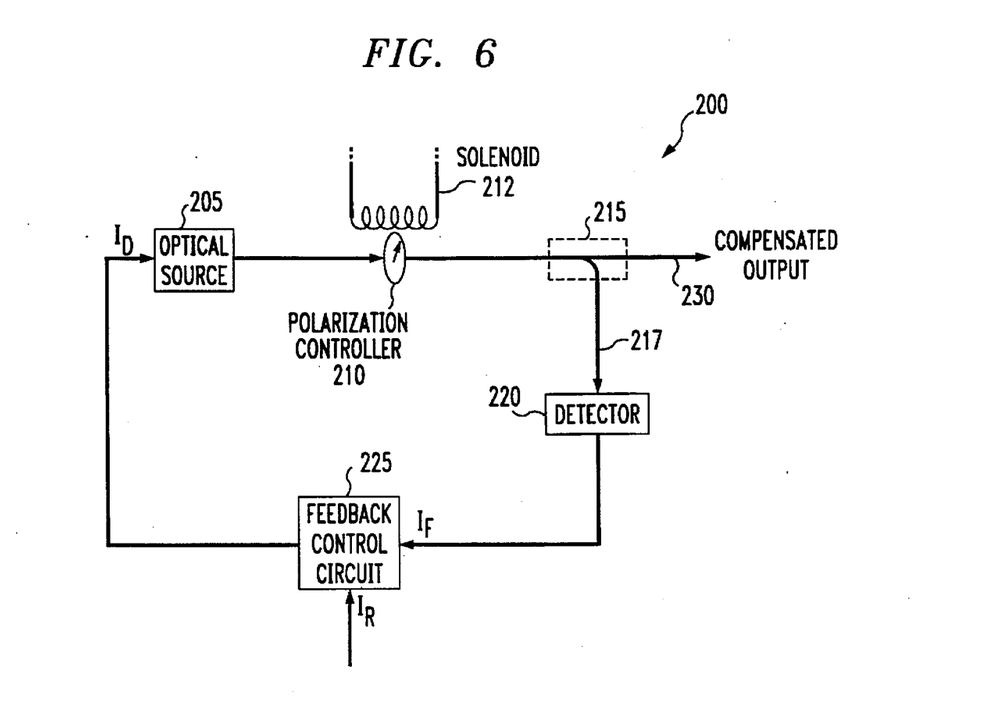
FIG. 6 is a block diagram of an exemplary optical system in which signal loss through a polarization controller is compensated using a feedback control circuit.

FIG. 6 illustrates an exemplary system in which variations in optical signal loss through a polarization controller, such as that shown in FIGS. 3 and 4, are compensated using a feedback control circuit. An optical system 200 includes an optical source 205 which provides an optical signal to a polarization controller 210. The source 205 may be, for example, a laser diode. The polarization controller 210 adjusts the polarization of the optical signal in accordance with a control signal applied to a solenoid 212, for example, in a manner similar to that described above in conjunction with FIG. 3. The optical signal is then applied to a coupler 215, which may be, for example, a 6 dB or a 10 dB coupler. One output of coupler 215 is applied via line 217 to a detector 220 which converts the coupled optical signal to an electrical feedback signal designated as $I_F$. A feedback control circuit 225 compares feedback signal $I_F$ with a reference signal $I_R$ and generates a suitable drive current $I_D$ for the optical source 205. The feedback control circuit 225 adjusts the source drive current $I_D$ such that changes in detected optical signal strength resulting from loss through the polarization controller 210 are compensated by increasing or decreasing the output signal level of source 205. As noted above, this loss may be a function of the magnetic field strength applied to a rotator element in the controller. A compensated optical signal is then supplied via line 230 to other system components, which are not shown. Those skilled in the art will recognize that the feedback control of system 200 may be utilized in a variety of different applications, including, for example, optical transmission systems or measurements of polarization-dependent loss (PDL), PMD and/or extinction ratio.

Although the above description illustrates the utility of the present invention primarily in terms of compensating for PMD-induced distortion in optical signals transmitted over single-mode fiber, it should be understood that the present invention is generally suitable for use with any optical system which includes PMD or would otherwise benefit from polarization diversity detection. Furthermore, the polarization control aspects of the present invention may be utilized in applications other than polarization diversity detection. Many variations may be made in, for example, the transmission medium, the type, number and arrangement of polarization controllers used to adjust optical signal polarization, the Faraday rotator, core, and other elements of a particular polarization controller, the polarization beam splitters and combiners, the signal receivers, the phase detectors, and the type and arrangement of other optical and electrical components in the diversity detection circuits. These and other alternatives and variations in the arrangements shown will be readily apparent to those skilled in the art.

I claim:

1. An apparatus for detecting an optical signal transmitted over a medium having polarization-dependent transmission properties, the apparatus comprising:

a polarization controller arranged in an optical signal path of the optical signal;

a polarization beam splitter arranged in the optical signal path after the polarization controller to separate the optical signal into a first polarization component and a second polarization component Of generally unequal relative strengths; and means for generating a control signal corresponding to a phase difference between the first and second polarization components, wherein the phase difference is measured between electrical data streams superimposed on the first and second polarization components in a manner independent of the relative strengths of the first and second polarization components, wherein the control signal is supplied to the polarization controller to adjust the polarization of the optical signal.

2. The apparatus of claim 1 wherein the polarization controller adjusts the polarization of the optical signal in response to the control signal derived from the phase difference such that first and second principal states of polarization of the optical signal are aligned respectively with the polarizations of the first and second polarization components of the polarization beam splitter.

3. The apparatus of claim 1 wherein the means for generating the control signal further includes:

first and second receivers adapted to receive the first and second polarization components, respectively, and to generate first and second clock signals, respectively, therefrom; and a phase detection circuit comprising a mixer whose DC output is a measure of phase, and adapted to receive the first and second clock signals and to generate the control signal as a phase difference between the first and second clock signals.

4. The apparatus of claim 1 wherein the polarization controller has a polarization rotation speed greater than about $100\pi$ radians per second.

5. The apparatus of claim 1 wherein the polarization controller further includes:

means for generating a magnetic field which varies in accordance with the control signal;

a rotator element disposed within the magnetic field and having at least a portion of the optical signal passing through it, the rotator element adjusting the polarization of the optical signal in accordance with the variations in the magnetic field; and means for coupling the optical signal out of the rotator element, wherein the means for coupling has a low numerical aperture such that a portion of the optical signal coupled out of the rotator element includes a substantially unscattered portion of the optical signal.

6. The apparatus of claim 5 wherein the rotator element includes one or more layers of an active garnet material.

7. The apparatus of claim 5 wherein the means for coupling the optical signal includes an output collimating lens having a low numerical aperture and arranged to receive the optical signal from and transmit the optical signal to an optical fiber making up at least a portion of the optical signal path.

8. The apparatus of claim 1 further including a second polarization controller arranged in the optical path of the optical signal before the polarization beam splitter, the second polarization controller having a polarization rotation speed on the order of about π radians per second.

9. The apparatus of claim 8 wherein the second polarization controller includes a half-wave plate and a quarter-wave plate.

10. The apparatus of claim 1 further including:

an optical polarization beam combiner adapted to receive and combine the first and second polarization components to provide a compensated optical signal; and a variable optical delay element arranged in a signal path of at least one of the polarization components to adjust the delay of one polarization component in response to the control signal such that the polarization components are maintained substantially in-phase at inputs of the polarization beam combiner.

11. The apparatus of claim 1 further including:

first and second receivers adapted to receive the first and second polarization components, respectively, and to generate first and second detected signals, respectively, therefrom;

an electrical signal combiner adapted to receive and combine the first and second detected signals to provide a compensated detected signal; and a variable electrical delay element arranged in a signal path of at least one of the detected signals to adjust the phase of the detected signal in response to the control signal such that the detected signals are maintained substantially in-phase at inputs of the electrical signal combiner.

12. A method of detecting an optical signal comprising the steps of:

separating the optical signal into a first polarization component and a second polarization component;

generating a control signal corresponding to a phase difference between the first and second polarization components of generally unequal strengths, wherein the phase difference is measured between electrical data streams superimposed on the first and second polarization components in a manner independent of the relative strengths of the first and second polarization components; and adjusting the polarization of the optical signal in response to the control signal prior to separating the optical signal into first and second polarization components.

13. The method of claim 12 wherein the step of adjusting the polarization includes adjusting the polarization such that at least one of the polarization components is substantially aligned with a principle state of polarization of the optical signal.

14. The method of claim 12 wherein the step of generating the control signal further includes:

generating first and second clock signals from the unequal first and second polarization components, respectively; and generating the control signal as a phase difference between the first and second clock signals.

15. The method of claim 12 wherein the step of adjusting the polarization of the input optical signal includes the step of applying the control signal corresponding to the phase difference to a polarization controller arranged in an optical signal path of the optical signal.

16. The method of claim 12, wherein the step of adjusting the polarization of the optical signal further includes the steps of:

generating a magnetic field which varies in accordance with the control signal;

providing a rotator element disposed within the magnetic field and having at least a portion of an optical signal passing through it, the rotator element adjusting the polarization of the optical signal in accordance with the variations in the magnetic field; and coupling the optical signal out of the rotator element using a low numerical aperture coupling means such that a portion of the optical signal coupled out of the rotator element includes a substantially unscattered portion of the optical signal.

17. The method of claim 16 wherein the step of coupling the optical signal includes providing a low numerical aperture output collimating lens arranged to receive the optical signal from and transmit the optical signal to an optical fiber making up at least a portion of a signal path of the optical signal.

18. The method of claim 12 further including the steps of:

combining the first and second polarization components to provide a compensated optical signal; and adjusting the phase of at least one of the polarization components of the optical signal in response to the control signal such that the polarization components are maintained substantially in-phase prior to combination.

19. The method of claim 12 further including the steps of:

generating first and second detected signals from the first and second polarization components, respectively;

combining the first and second detected signals to provide a compensated detected signal; and adjusting the phase of at least one of the detected signals in response to the control signal such that the detected signals are maintained substantially in-phase prior to combination.

* * * * *